United States Patent [19]

Slee

[11] Patent Number: 4,510,895

[45] Date of Patent: Apr. 16, 1985

[54] PISTONS FOR INTERNAL COMBUSTION ENGINES

[75] Inventor: Roger H. Slee, Warwick, England

[73] Assignee: AE PLC, London, England

[21] Appl. No.: 530,683

[22] Filed: Sep. 9, 1983

[30] Foreign Application Priority Data

Sep. 11, 1982 [GB] United Kingdom ............... 8225967

[51] Int. Cl.³ .............................................. F02B 9/10
[52] U.S. Cl. ................................. 123/48 B; 123/78 B; 123/660; 123/193 P
[58] Field of Search ............... 123/48 R, 48 B, 78 R, 123/78 B, 193 R, 193 P, 279, 660

[56] References Cited

U.S. PATENT DOCUMENTS

| | | | |
|---|---|---|---|
| 2,143,586 | 1/1939 | Wälti | 123/193 R |
| 2,742,027 | 4/1956 | Mansfield | 123/78 R |
| 3,038,458 | 6/1962 | Mansfield | 123/78 B |

FOREIGN PATENT DOCUMENTS

| | | | |
|---|---|---|---|
| 1153247 | 9/1957 | France | 123/78 B |
| 235676 | 4/1924 | United Kingdom . | |
| 300808 | 12/1927 | United Kingdom . | |

*Primary Examiner*—Craig R. Feinberg
*Assistant Examiner*—David A. Okonsky
*Attorney, Agent, or Firm*—Leydig, Voit, Osann, Mayer & Holt, Ltd.

[57] ABSTRACT

A piston (10) for a diesel engine is formed with a combustion bowl (21) which has a lesser volume until the cylinder pressure reaches that at which fuel ignition takes place. The volume of the combustion bowl is then increased to reduce the maximum pressure in the cylinder. The volume is again decreased during the expansion stroke. This has a number of beneficial effects on the engine including reducing the stress on the engine parts and allowing increased level of pressure-charging.

6 Claims, 4 Drawing Figures

PISTONS FOR INTERNAL COMBUSTION ENGINES

BACKGROUND TO THE INVENTION

1. Field of the Invention

The invention relates to pistons for internal combustion engines and more particularly to pistons for diesel engines.

2. Review of the Prior Art

Since the fuel in a diesel engine is ignited by the temperature of air compressed in the cylinder prior to injection of the fuel, it is necessary, if combustion is to take place, to compress the air by a predetermined amount to ensure that the required temperature for fuel ignition is reached. The fuel is, however, injected before a piston in a cylinder of the engine reaches top dead centre and so the pressure in the cylinder continues to rise after the fuel has been injected.

In view of the high compression ratios used in diesel engines, the maximum cylinder pressure, reached, at or shortly after top dead centre, can be substantial. This peak pressure imposes loads on the piston which can damage bearings and reduce the effectiveness of lubrication. In addition, it can cause shock waves to pass through the engine block which can in turn cause cavitation in water cooling systems which leads to erosion of metal from the water side of the cylinders. The rate at which the pressure rises also causes fatigue and cracking in the piston and reduces the life of the gudgeon pin bosses. Further, the high rate of pressure rise is an important factor in the noise emission spectrum of diesel engines. The maximum pressure also determines the amount by which the air can be pressurised before entry into the cylinder and affects adversely the equipment for injecting the fuel. In addition, in certain cases, it makes the use of a heater necessary on starting the engine.

SUMMARY OF THE INVENTION

According to the invention there is provided a piston for an internal combustion engine and comprising a crown formed at least partially by a member movable relatively to the remainder of the piston, the member moving in each compression stroke, when the pressure in the associated cylinder reaches a predetermined level, from a first position to a second position in which the combustion chamber volume is increased, the member maintaining said second position until a predetermined pressure is reached on each expansion stroke, when the member returns to said first position.

BRIEF DESCRIPTION OF THE DRAWINGS

The following is a more detailed description of some embodiments of the invention, by way of example, reference being made to the accompanying drawings, in which.

DESCRIPTION OF THE PREFERRED EMBODIMENTS

Figure 1:
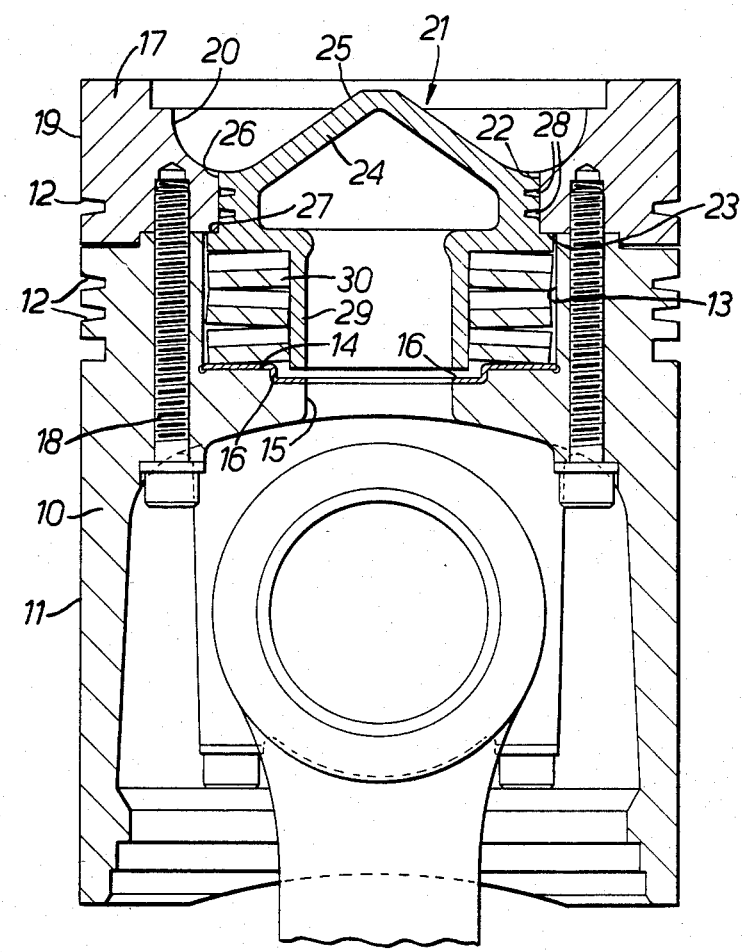
FIG. 1 is a cross-section through a first form of piston for a diesel engine having a combustion bowl of variable volume.

Referring first to FIG. 1, the first form of piston comprises a piston body 10 cast from aluminum or aluminum alloy and formed with a skirt 11 and piston ring grooves 12. The centre of the body is provided with a cylindrical bore 13 terminating at its lower end in an annular radially extending surface 14 provided with a central hole and an annular step 15. The surface 14 is covered with a steel plate 16. A crown 17, of an aluminum or ferrous alloy, is fixed to the body portion 10 by bolts 18 and includes an outer surface 19 contiguous with the skirt 11 and formed, optionally, with a further piston ring groove 12. The crown 17 is generally annular and is provided with a radially inner annular surface 20 which forms an entrance to a combustion bowl 21. An annular bore 22 leads from the radially inner edge of the surface 20. The diameter of the bore 22 is less than the diameter of the bore 13 in the piston body so that a step 23 is formed between the two parts.

A generally cylindrical piston-like member 24 is carried by the piston body 10 and is formed with an upper surface 25 which forms the central portion of the combustion chamber 21. The member 24 has a cylindrical outer surface 26 and is a sliding fit in the crown bore 22. The surface 26 terminates in an annular rabbet 27 which, in the position of the member 24 shown in FIG. 1, is in engagement with the step 23 between the crown 17 and the piston body 10 to prevent axial movement of the member 24 in an upward direction. The cylindrical surface 26 is provided with grooves 28 which receive sealing rings (not shown) for forming a seal between the member 24 and the crown 17.

The member 24 also includes a lower portion 29 of generally cylindrical configuration which is received within the bore 13 in the piston body 10 and which has a diameter substantially less than the diameter of that bore. Within the annular gap between the lower portion 29 and the bore 13 are arranged grouped pairs of plate springs 30, the uppermost bearing against the member 24 and the lowermost bearing against the steel plate 16. The arrangement is such that the plate springs 30 are held under partial compression or preload when the piston is in the position shown in FIG. 1.

The piston is assembled by inserting the plate 16 into the piston body 10 and then placing the plate springs 30 on the plate 16. The member 24 is then inserted with the cylindrical part 29 extending down through the washers into abutment with the plate springs 30. The crown 17 is then placed in position so that the step 23 presses down on the rabbet 27 of the member 24 thus partially compressing the plate springs 30. The bolts 18 are then inserted to fix the crown 17 to the piston body and hold the plate springs 30 under the partial compression.

In use, the piston is inserted into a cylinder of a diesel engine which may be a two-stroke or four-stroke diesel engine and may be either naturally aspirated or preferably pressure-charged. As is well known, a diesel engine works on the principle of compressing a charge of air to a temperature at which diesel fuel will ignite and then, when the requisite compression has been reached, injecting the fuel to produce an expansion and exhaust stroke followed by recompression and combustion. The fuel is injected before top dead centre. In order to achieve the necessary air temperature to initiate combustion, the compression ratio of the engine must be much higher than that in an Otto cycle engine; for example, between 12 and 18:1 with direct injection engines.

After the fuel has been injected, and combustion commenced, the pressure increases to reach a maximum pressure just after top dead centre, before declining in the expansion stroke. This is shown schematically by the broken line 31 in FIG. 2 for a conventional piston not including the member 24. The high maximum pressure has a number of adverse results amongst which are the high stressing of bearings and engine parts, the breaking down of lubrication films, the production of shock waves passing through the engine block which in turn can cause cavitation in a water cooling system leading to erosion of the metal of the engine, and the inability of the engine to withstand high boost for a long periods. Further, this maximum pressure has an adverse effect on the fuel injection equipment, may cause difficulties in starting, and in the attainment of acceptable noise emission and vibration spectrums.

The piston described above with reference to FIG. 1 operates in the following way. As the piston commences the compression stroke to compress the charge of air, the member 24 remains in the position shown in FIG. 1 so that the combustion bowl has a lesser volume. The piston is thus acting in the same way as a conventional piston to compress the air to the temperature necessary to cause combustion of the fuel. Fuel injection then takes place and the plate springs 30 are so preloaded, that, up to the pressure reached at fuel injection, no movement of the member 24 has occurred. At this point, however, the cylinder pressure acting on the combustion bowl surface 25 of the member 24 is sufficient to compress the plate springs 30 to cause the member 24 to slide in the bore 22 in the crown 17 to a second position (not shown) in which the combustion bowl 21 has a much greater volume. The lower end of the member 24 bears aginst the portion of the plate 16 radially inwardly of the step 14. The plate 16 thus prevents the plate springs 30 and the member 24 wearing away the piston body.

The result of this is that the minimum volume of the combustion chamber in the cylinder is increased and the maximum pressure reduced. Once the piston has passed top dead centre and maximum pressure, the cylinder pressure reduces until the limiting pressure is once again reached. The member 24 then moves back to the first position shown in FIG. 1 in which the rabbet 27 abuts against the step 23 and the combustion bowl 21 has its lesser volume.

Figure 2:
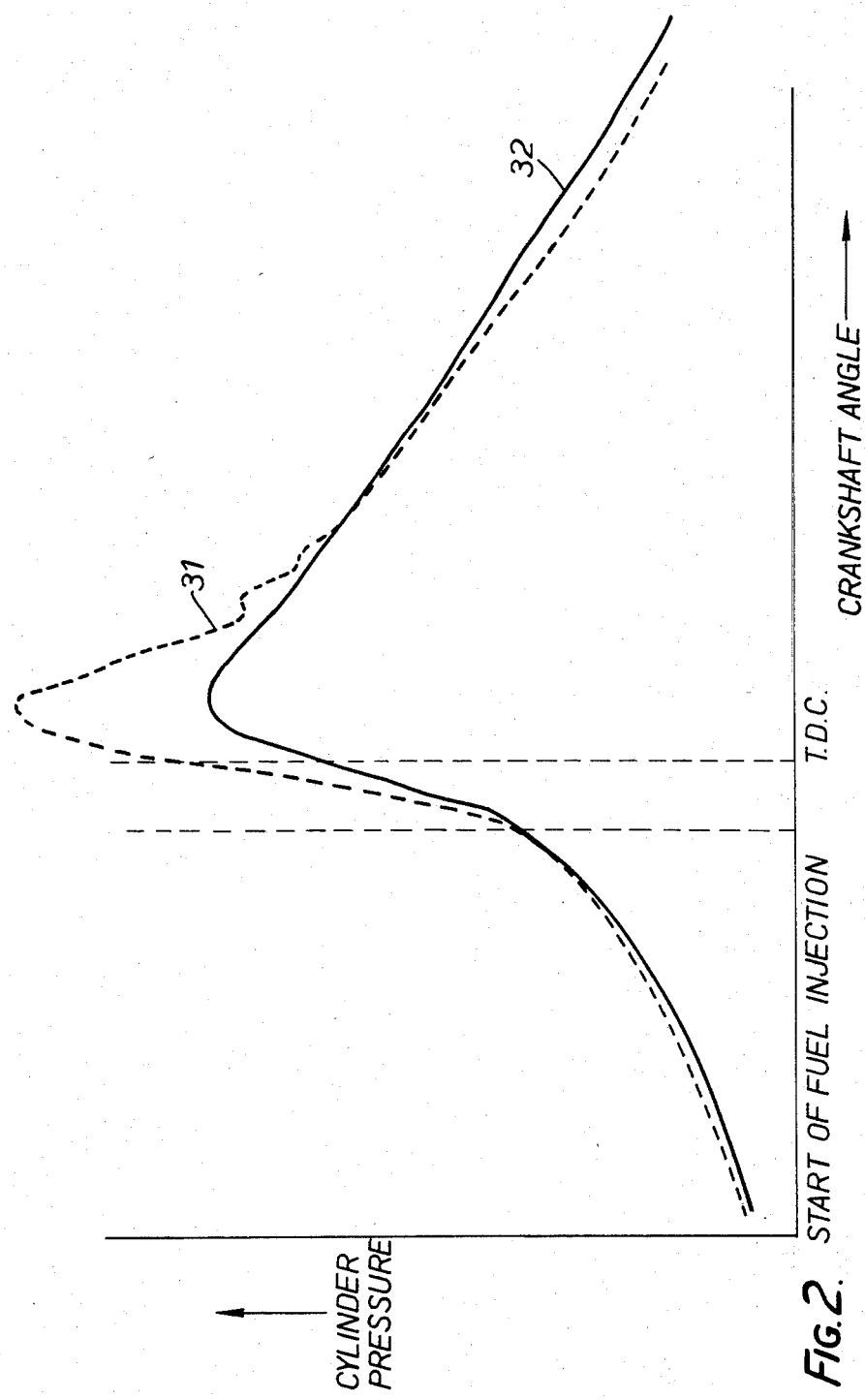
FIG. 2 is a graph showing diagrammatically the variation of pressure within the cylinder of a diesel engine against crankshaft angle for the piston of FIG. 1 and for a piston having a combustion bowl of fixed volume.

This is shown schematically in FIG. 2 in the continuous line 32. It will be seen that the curves 31, 32 follow one another until the fuel injection point is reached. The cylinder pressure is then reduced in comparison with the conventional piston until a balancing pressure is reached once again when the two curves virtually regain coincidence.

The piston of FIG. 1 has the following advantages:

1. The peak cylinder pressure is reduced together with the rate of pressure rise following injection. This leads to increased bearing life through reduced loading while assisting in the maintenance of a satisfactory oil film at the crank pin bearing and gudgeon pin bearing surfaces.

2. The cyclic torque characteristics of the engine are improved and some of the energy absorbed around top dead centre is subsequently yielded up on the expansion stroke. Thus the specific output of the engine will remain equal to or slightly better than that of an engine not using the piston described above with FIG. 1, for a given level of fuel input. Thus the need for reduction in specific output to produce smoother and quieter combustion is obviated and there is less shock vibration in the engine structure.

3. The intensity of shock waves is reduced, leading to a decreased tendency to cavitation erosion in water cooled cylinder liners.

4. Because of the increased volume of the combustion bowl 21, the surface 25 should have a longer life with less combustion bowl edge erosion. In addition, gudgeon pin life should be increased by the reduced pressure.

5. The engine will stand higher levels of pressure-charging for longer periods, providing cooling facilities are adequate.

6. Such a piston may simplify fuel injection equipment and the cost of such equipment and, in some cases, may allow the elimination of use of a heater on starting.

7. There may be an ability of the engine to accept differing fuels without redesign.

8. The compression ratio is unaffected at starting and so there will be no adverse effect on the starting characteristics of the engine.

The space within which the springs are located may be supplied with oil, both to cool the springs and to damp the movement of the member 24.

It will be appeciated that the piston need not be provided with a combustion bowl 21. The piston could have a conventional flat crown with the member 24 opening up a recess when the predetermined pressure is reached in closing the recess when the cylinder pressure drops below the predetermined pressure. It will also be appreciated that the piston need not use plate springs 30, any suitable spring means such as coil springs may be used.

Figure 3:
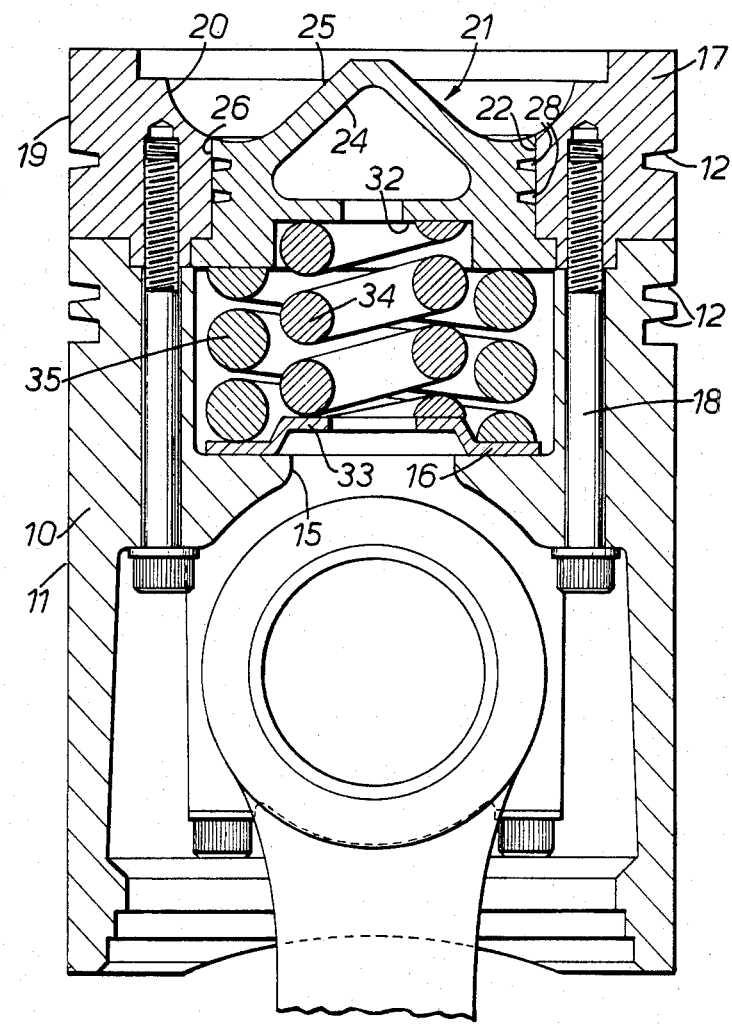
FIG. 3 is a cross-section through a modified form of the piston of FIG. 1.
Figure 4:
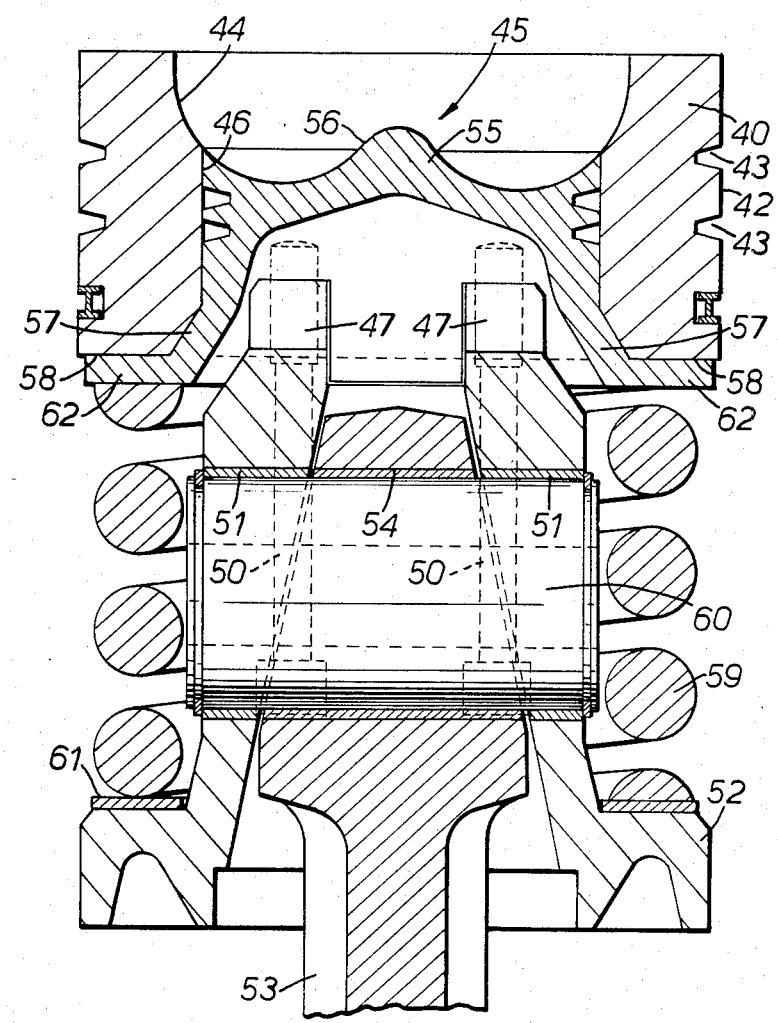
FIG. 4 is a cross-section through a second form of piston for a diesel engine and having a combustion bowl of variable volume.

Two embodiments using coil springs are shown in FIGS. 3 and 4. In FIG. 3, the piston is constructed generally as the piston described above with reference to FIG. 1 and parts common to FIG. 1 and FIG. 3 will be given the same reference numerals and will not be described in detail. In the piston of FIG. 3, the member 24 is provided on its under surface with a central annular recess 32 and the steel plate 16 is formed with a central upward boss 33. Two co-axial coil springs 34, 35 are arranged between the member 24 and the steel plate 16. The inner coil spring 34 engages the recess 32 and the boss 33 and the outer coil spring 35 engages outer portions of the member 24 and the plate 16. The coil springs 34, 35 have opposite hands.

The piston of FIG. 3 operates in the same way as the piston of FIG. 1 and has the same benefits. The provision of two coil springs 33, 34 allows an increased force to be applied to the member 24 as compared with the FIG. 1 piston. This may be desirable in certain diesel engines where particularly high pressures are generated.

Referring next to FIG. 4, the second form of piston comprises a crown 40 and a body 41 both formed from aluminum or an aluminum alloy. The crown 40 is generally annular and is provided with a ring band 42 including three piston ring grooves 43. The centre of the crown 40 is provided with an annular surface 44 which forms an entrance to a combustion bowl 45. An annular bore 46 leads downwardly from the inner edge of the surface 44.

The body 41 comprises a generally frusto-conical central portion 49 connected by bolts 50 to the crown 40. The upper end of the body is formed with spaced projections 47 which are drawn against the crown 40 by the bolts 50 and which are angularly spaced to form slots between them. Aligned gudgeon pin bores 51 are provided and the lower end of the central portion 49 is connected to an annular skirt 52 having an upper surface lying in a plane normal to the piston axis. A shaped connecting rod 53 has a gudgeon pin bore 54 aligned with the gudgeon pin bore 54 in the body 41 and connected thereto by a pin 60.

A generally cylindrical piston-like member 55 is a sliding fit in the crown bore 46 and is formed with an upper surface 56 which forms the central portion of the combustion bowl 45. The member 55 has downwardly and outwardly extending spider arms 57 which pass through the slots between the projections 47 on the body 41 and carry at their ends an annulus 62 which engages beneath a lower surface 58 of the crown 40. Thus the member 55 is free for sliding movement within the crown bore 56 relatively to the crown 40 and the body 41.

A partially compressed coil spring 59 is arranged between the annulus 62 and a washer 61 provided on the skirt 52. This urges the member 55 into the position shown in FIG. 4.

The piston described above with reference to FIG. 4 operates in the same way as the pistons described above with reference to FIGS. 1 to 3 and has the same benefits. In comparison with the pistons of FIGS. 1 to 3, the piston of FIG. 4 is of light-weight and the increased length of the spring 59 allows it to bear against the member 55 with increased force.

The combustion bowl, where provided, can have any required shape.

Although the pistons of FIGS. 1 to 4 have been described in relation to a diesel engine, it will be appreciated that they may be used in an Otto cycle engine or any other type of engine.

I claim:

1. A Diesel engine piston comprising:
   a crown,
   a combustion bowl provided in said crown,
   a radially inner annular surface extending around the crown and forming a fixed portion of said combustion bowl,
   an annular bore provided in said crown and leading from a radially inner edge of said fixed portion,
   a member having a generally cylindrical surface which is a sliding fit in said annular bore for movement between first and second positions,
   an upper surface to said member providing a central portion of said combustion bowl inwardly of said fixed portion,
   biassing means providing a biassing force on said member to bias said member towards said first position in which said fixed portion and central portion form said combustion bowl, said member being moved against said biassing force to said second position in each compression stroke of the diesel engine when the pressure in the combustion bowl reaches a predetermined level, in which second position the volume of the combustion bowl is increased, the second position being maintained until a second predetermined position is reached on each expansion stroke, when the member returns to said first position.

2. A piston according to claim 1 wherein the cylindrical surface carries at least one ring forming a seal between the member and the cylindrical bore.

3. A piston according to claim 1 wherein the movement of the member to said first position is limited by engagement between co-operating parts of the remainder of the crown and the member.

4. A piston according to claim 1 wherein the crown is formed separately from the remainder of the piston and is fixed thereto.

5. A piston according to claim 1, wherein the biassing means is spring means acting on said member.

6. A piston according to claim 5 wherein the spring means are formed by at least one pretensioned plate spring.

* * * * *